United States Patent
Sato et al.

(10) Patent No.: US 7,501,464 B2
(45) Date of Patent: Mar. 10, 2009

(54) PROCESS FOR PRODUCING ALIPHATIC POLYESTER COMPOSITION

(75) Inventors: Hiroyuki Sato, Fukushima-Ken (JP); Fumio Akutsu, Fukushima-Ken (JP); Fuminori Kobayashi, Fukushima-Ken (JP); Yuki Hokari, Fukushima-Ken (JP)

(73) Assignee: Kureha Corporation, Tokyo (JP)

( * ) Notice: Subject to any disclaimer, the term of this patent is extended or adjusted under 35 U.S.C. 154(b) by 178 days.

(21) Appl. No.: 11/588,341

(22) Filed: Oct. 27, 2006

(65) Prior Publication Data
US 2007/0100037 A1 May 3, 2007

Related U.S. Application Data

(60) Provisional application No. 60/731,260, filed on Oct. 31, 2005.

(51) Int. Cl.
*C08K 5/521* (2006.01)
*C08G 63/02* (2006.01)

(52) U.S. Cl. ............... 524/145; 524/139; 524/140; 524/141; 524/147; 524/195; 528/271

(58) Field of Classification Search .......... 524/120
See application file for complete search history.

(56) References Cited

U.S. PATENT DOCUMENTS 7,179,868 B2 * 2/2007 Yamane et al. ............. 525/437

2003/0228478 A1 * 12/2003 Takahashi et al. .......... 428/480

FOREIGN PATENT DOCUMENTS

| EP | 1 686 145 A1 | 8/2006 |
| JP | 2001-261797 A | * 9/2001 |
| WO | WO 2004/087813 | * 10/2004 |
| WO | 2005/044894 | 5/2005 |

OTHER PUBLICATIONS

Machine Translation of JP 2001-261797.*

* cited by examiner

*Primary Examiner*—Marc S Zimmer
*Assistant Examiner*—John Uselding
(74) *Attorney, Agent, or Firm*—Wenderoth, Lind & Ponack, L.L.P.

(57) ABSTRACT

For producing an aliphatic polyester resin composition containing a thermal stabilizer and a carboxyl group-capping agent, the aliphatic polyester resin is first mixed in a hot-melt state with the thermal stabilizer and then mixed in a hot-melt state with the carboxyl group-capping agent. As a result thereof, the resultant aliphatic polyester resin composition is provided with better moisture resistance and noticeably improved heat resistance (less coloring) than in the case where these additives are simultaneously added to effect the hot-melt mixing.

3 Claims, No Drawings

PROCESS FOR PRODUCING ALIPHATIC POLYESTER COMPOSITION

RELATED APPLICATION

This application claims the benefit of U.S. Provisional Application Ser. No. 60/731,260, filed Oct. 31, 2005.

FIELD OF THE INVENTION

The present invention relates to a process for producing a resin composition principally comprising an aliphatic polyester, such as polyglycolic acid, particularly a composition improved with respect to thermal stability (coloring).

RELATED BACKGROUND ART

An aliphatic polyester, such as polyglycolic acid or polylactic acid, can be decomposed by microorganisms or enzymes present in nature, such as soil or sea water, and is therefore noted as a biodegradable polymer material giving little load to the environment. Further, an aliphatic polyester has degradability and absorbability in vivo, so that it is used also as a polymer material for medical use, such as sutures for surgery or artificial skin.

Among the aliphatic polyesters, polyglycolic acid is excellent in gas barrier properties, such as oxygen gas barrier property, carbon dioxide gas barrier property and water vapor barrier property, and also is excellent in heat resistance and mechanical properties, and therefore the development of new use thereof by itself or as a composite material together with another resin material, is under way.

However, aliphatic polyesters, inclusive of polyglycolic acid, are generally hydrolyzable and accompanied with a problem that they are colored noticeably during melt processing.

SUMMARY OF THE INVENTION

A principal object of the present invention is to provide a process for producing an aliphatic polyester resin composition with improved thermal stability (coloring).

According to our study, it has been found possible to provide an aliphatic polyester resin composition a thermal stabilizer and a carboxyl group-capping agent with further improved moisture resistance and thermal stability (coloring) by adding a thermal stabilizer and a carboxyl group-capping agent thereto not simultaneously but sequentially for hot-melt mixing.

More specifically, the process for producing an aliphatic polyester resin composition according to the present invention is characterized by subjecting an aliphatic polyester resin first to hot-melt mixing with a thermal stabilizer and then to hot-melt mixing with a carboxyl group-capping agent.

DESCRIPTION OF THE INVENTION

The aliphatic polyester resins constituting the aliphatic polyester resin composition according to the present invention may include homopolymers and copolymers of aliphatic ester monomers, inclusive of: glycolic acid including glycolic acid and glycolide which is a bimolecular cyclic ester of glycolic acid; cyclic monomers, inclusive of ethylene oxalate (i.e., 1,4-dioxane-2,3-dione); lactides; lactones, such as β-propiolactone, β-butyrolactone, pivalolactone, γ-butyrolactone, δ-valerolactone, β-methyl -δ-valerolactone, and ε-caprolactone; carbonates, such as trimethylene carbonate; ethers, such as 1,3-dioxane; ether-esters, such as dioxanone; and amides, such as ε-caprolactam; hydroxycarboxylic acids, such as lactic acid, 3-hydroxypropanoic acid, 4-hydroxybutanonic acid and 6-hydroxycaproic acid, and their alkyl esters; substantially equal molar mixtures of aliphatic diols, such as ethylene glycol and 1,4-butane diol with aliphatic dicarboxylic acids, such as succinic acid and adipic acid, and their alkyl or aromatic esters. Among these, it is preferred to use a homopolymer or a copolymer of hydroxycarboxylic acid in view of heat resistance, particularly a poly glycolic acid resin comprising a homopolymer or a copolymer of glycolic acid, which is excellent in heat resistance, gas-barrier property and mechanical strength.

More specifically, the polyglycolic acid resin used in the present invention is a homopolymer or a copolymer comprising a recurring unit (glycolic acid unit) represented by a formula: —(—O—$CH_2$—C(O)—)—. The content of the recurring unit represented by the above formula in the polyglycolic acid resin may be at least 60 wt. %, preferably at least 70 wt. %, more preferably at least 80 wt. %. The upper limit thereof is 100 wt. %. If the content of the recurring unit of the above formula is too little, the gas-barrier property and heat resistance are lowered.

The polyglycolic acid resin may be made a glycolic acid copolymer which is caused to contain at least one polymerized unit of a comonomer copolymerizable with glycolic acid in addition to the glycolic acid unit represented by the above formula.

As the comonomers, it is possible to use the above-mentioned monomers for constituting the aliphatic polyester resin other than glycolic acid, particularly α-hydroxy-carboxylic acids, among which lactic acid (or the lactide thereof) is preferred.

The glycolic acid (co) polymer used in the present invention may preferably have a melt viscosity of 100-10,000 Pa·s, more preferably 300-8,000 Pa·s, particularly preferably 400-5,000 Pa·s, when measured under the conditions of a temperature of 240° C. and a shear rate of 100 $sec^{-1}$.

In order to obtain an aliphatic polyester resin composition containing a thermal stabilizer and a carboxyl group-capping agent according to the present invention, the aliphatic polyester resin is first subjected to hot-melt mixing with a thermal stabilizer.

As the thermal stabilizer, it is possible to preferably use at least one compound selected from the group consisting of a phosphoric acid ester having a pentaerythritol skeleton (or cyclic neopentane-tetra-il structure) and an alkyl phosphate or phosphite ester having at least one hydroxyl group and at least one alkyl ester group (e.g., as disclosed in WO 2004/087813A1). Such a thermal stabilizer may be incorporated in a proportion of preferably 0.003-3 wt. parts, more preferably 0.005-1 wt. part, per 100 wt. parts of the aliphatic polyester resin.

The aliphatic polyester resin, which has been hot-melt-mixed with the thermal stabilizer, is then subjected to hot-melt mixing with a carboxyl group-capping agent.

As the carboxyl group-capping agent, it is generally possible to use compounds having a function of capping a carboxyl terminal and known as an agent for improving moisture resistance of aliphatic polyesters, such as polylactic acid (e.g., as disclosed in JP-A 2001-261797). Examples thereof may include: carbodiimide compounds inclusive of monocarbodiimides and polycarbodiimides, such as N,N-2,6-diisopropylphenylcarbodiimide; oxazoline compounds, such as 2,2'-m-phenylene-bis(2-oxazoline), 2, 2'-p-phenylene-bis(2-oxazoline), 2-phenyl-2-oxagoline, and styrene-isopropenyl-2-oxazoline; oxazine compounds, such as 2-methoxy-5, 6-dihydro-4H-1,3-oxazine; and epoxy compounds, such as N-glycidylphthalimide, cyclohexene oxide, and tris (2,3-epoxypropyl) isocyanurate.

Among these, carbodiimide compounds are preferred regardless of aromatic, alicyclic or aliphatic ones, whereas aromatic carbodiimide compounds are particularly preferred, especially those of a high purity so as to provide a high anti-moisture stabilizing effect.

These carboxyl group-capping agents can be used in combination of two or more species as desired, and may preferably be used in a proportion of 0.01-10 wt. parts, further preferably 0.05-2.5 wt. parts, particularly preferably 0.1-1.8 wt parts, per 100 wt. parts of the aliphatic polyester resin. The addition of a further increased amount scarcely provides a further improvement effect and is liable to increase the coloring of the composition. If the addition amount is less, the moisture resistance -improving effect is liable to be insufficient.

In order to mix the thermal stabilizer and the carboxyl group-capping agent successively with the aliphatic polyester resin in a hot melting state, it is preferred to effect the melting and kneading by using an extruder. As a result thereof, it is possible to obtain an aliphatic polyester resin composition with improved moisture resistance. It is particularly preferred to use a twin-screw extruder to effect the melt-kneading at a temperature of 200-300° C. For effecting the successive mixing of these additives, there may be used, for example, a method of first melt-mixing an aliphatic polyester resin with a thermal stabilizer to obtain a primary granular composition and melt-mixing the composition with a carboxyl group-capping agent; or a method of using an extruder for the melt-mixing by supplying an aliphatic polyester resin and a thermal stabilizer from an upstream stage of the extruder and then supplying a carboxyl group-capping agent from an intermediate stage of the extruder to continue the melt-kneading, thereby extruding the melt mixture.

In the aliphatic polyester resin composition according to the present invention, in addition to the above-mentioned components added principally in order to improve the moisture resistance and heat resistance, it is possible to incorporate 0.001-5 wt. parts of other additives, as desired, per 100 wt. parts of the aliphatic polyester resin, such as a catalyst actively-suppressing agent, a plasticizer, a thermal radiation absorber, an ultra-violet ray absorber, a pigment, etc. These additives can also be melt-kneaded with the aliphatic polyester resin together with the above-mentioned thermal stabilizer and carboxyl group-capping agent by means of an extruder.

The aliphatic polyester resin composition thus-obtained according to the present invention may be formed by itself as a mixture with another thermoplastic resin (preferably containing the aliphatic polyester resin in at least 90 wt. %) or as a composite material, such as a laminate product, into various shapes of a film or sheet, a filament, a blow-molded container, a lid, a bag-shaped container and a tubular packaging material. The film or sheet may ordinarily be further processed and formed into a cup, a tray, a bag-shaped container, etc.

Examples of another thermoplastic resin may include polyolefin resins, thermoplastic polyester resins, polystyrene resins, chlorine-containing resins, polyamide resins, polycarbonate resins, cyclic olefin resins, polyurethane resins, polyvinylidene chloride resin, ethylene-vinyl alcohol copolymer (EVOH), and aliphatic polyester resins, and these resins can be used in mixture within an extent of not adversely affecting the desired properties of the shaped product.

In the laminate product, it is possible to dispose an adhesive resin layer between the respective layers for the purpose of, e.g., enhancing the inter-layer peeling strength. As the adhesive resin (or simply "adhesive"), it is preferred to use a resin that is capable of melt-processing, such as extrusion and exhibits a good adhesiveness to the respective resin layers.

In the forming or processing of a sheet or film of the aliphatic polyester resin composition according to the present invention, the sheet or film can be uniaxially stretched or biaxially stretched simultaneously or successively to enhance the degree of orientation, thereby improving the properties, such as gas barrier property and mechanical properties. During the stretching, it is important to set appropriate conditions. The stretching temperature may preferably be 100° C. or below, particularly below 80° C., and further preferably 45-65° C. In the case of successive biaxial stretching, the stretching temperatures in the two directions can be different, preferably with a higher temperature for stretching in the lateral direction. The stretching ratio may preferably be 1.1-5.0 times, more preferably 2-4 times, in each of uniaxial (longitudinal) or biaxial (longitudinal and transversal) directions.

After the above stretching treatment, the stretched product may preferably be heat-treated by holding the product at 100-200° C. for 10 seconds to 20 minutes from the viewpoints of, e.g., further improvement of the size stability, heat resistance and gas barrier property of the shaped product.

The thus-obtained stretched or unstretched shaped product of a single layer of or laminate with another thermoplastic resin layer of aliphatic polyester resin can be further laminated with a further different thermoplastic resin layer by co-extrusion or lamination processing with an optionally used adhesive.

If a bottomed multilayer preform (character "U"-shaped preform) formed by laminating an aliphatic polyester resin composition obtained according to the present invention with an aromatic polyester resin such as PET is subjected to stretching blow molding in a mold, it is possible to obtain a bottle excellent in properties, such as gas barrier property and mechanical properties. The bottomed multilayer preform may ordinarily have a thickness of 1-10 mm. For the stretching, the setting of appropriate conditions is important.

Similarly as other shaping processes, the heat source is not particularly restricted, such as IR (infrared rays), hot air, hot medium bath or electromagnetic wave, but the preform may ordinarily be preheated by an IR (infrared rays) heating apparatus and thereafter immediately be transferred into a mold, whereby the preform is blow molded while being stretched by introducing compressed air through its mouth. The stretching can also be effected by using a rod simultaneously in addition to the compressed air. By the heating, it is preferred to elevate the surface temperature of the multilayer preform up to 80-200° C., more preferably 85-150° C., particularly preferably 90-120° C.

After the stretching forming described above, it is also possible to effect a post-treatment, such as heat-setting, or a post-treatment for providing an additional resin layer, such as lamination processing or coating. The treatment temperature for the heat-setting may preferably be 40-210° C., and a temperature of below the melting point of polyglycolic acid resin, more preferably in a temperature range of from the melting point minus 20° C. to 120° C. in the case where the aliphatic polyester is polyglycolic acid resin. The lamination processing may include: wet lamination, dry lamination, extrusion lamination, hot-melt lamination, non-solvent lamination, etc.

EXAMPLES

Hereinbelow, the present invention will be described more specifically based on Examples and Comparative Examples. In the following descriptions, "parts", "%" and "ppm" are by weight unless otherwise noted specifically. The physical properties (values) described in the present specification including the following description are based on values measured according to the following methods.

(1) Glycolide Content

To ca. 100 mg of a sample polyglycolic acid resin (PGA) (composition), 2 g of dimethyl sulfoxide containing 4-chlorobenzophenone as an internal standard at a concentration of 0.2 g/l, was added, and the mixture was heated at 150° C. for ca. 5 min. to dissolve the resin and, after being cooled to room temperature, was subjected to filtration. Then, 1 µl of the filtrate solution was taken and injected into a gas chromatography (GC) apparatus for measurement. From a value obtained from the measurement, a glycolide content was calculated in terms of wt. % contained in the polymer. The GC analysis conditions were as follows.
Apparatus: "GC-2010" made by K.K. Shimadzu Seisakusho)
Column: "TC-17" (0.25 mm in diameter×30 mm in length).
Column temperature: Held at 150° C. for 5 min., heated at 270° C. at a rate of 20° C./min. and then held at 270° C. for 3 min.
Gasification chamber temperature: 180° C.
Detector: FID (hydrogen flame ionization detector) at temperature of 300° C.

(2) Terminal Carboxyl Group Concentration

From a press sheet prepared in the same manner as a sample for evaluating moisture resistance, a sample was cut, accurately weighed at ca. 0.3 g and completely dissolved in 10 ml of dimethyl sulfoxide of a reagent grade on an oil bath for ca. 3 min. Two drops of an indicator (0.1 wt. % Bromothymol Blue/methyl alcohol solution) was added and further a 0.02 normal-sodium hydroxide/benzyl alcohol solution was gradually added thereto until a termination point where the color of the solution changed from yellow to green by observation with eyes. From the amount of the dropped sodium hydroxide solution, a carboxyl group concentration was calculated in terms of equivalents per t (ton) of PGA resin.

(3) Moisture Resistance Evaluation

Ca. 1 g of a pellet sample was sandwiched between aluminum plates and heated for 3 minutes on heat press machine at 260° C. Then, the sample was held for 1 minute under a pressure of 5 MPa and then immediately transferred to a press machine cooled with circulating water to be cooled to form a transparent amorphous press sheet. The press sheet thus formed was then heat-treated for 10 minutes at 80° C. in the state of being sandwiched between the aluminum plates.

Ca. 10 mg of a sample was cut out from the press sheet prepared through the above operation and held for 3 days in a constant temperature and humidity chamber held at a temperature of 50° C. and relative humidity of 90%. The sample was taken out after the 3 days and measured with respect to a molecular weight by gel permeation chromatography (GPC). A molecular weight retentivity was calculated from the measured molecular weight and a molecular weight of sample before being placed in the constant temperature and humidity chamber, and a moisture resistance was evaluated based on the molecular weight retentivity.

(4) Molecular Weight Measurement

Ca. 10 mg of a sheet-form resin sample was completely dissolved in 0.5 ml of dimethyl sulfoxide of a reagent grade on an oil bath at 150° C. The solution was quenched by cold water and was increased up to a volume of 10 ml by addition of hexafluoroisopropanol (HFIP) containing sodium trifluoroacetate dissolved therein at 5 mM. The resultant solution was filtrated through a 0.1 µm-membrane filter made of polytetrafluoroethylene and then injected into a GPC apparatus for measurement of molecular weight under the following conditions. Incidentally, the sample was injected into the GPC apparatus within 30 minute after the dissolution.

<GPC Measurement Conditions>
Apparatus: "Shodex-104" made by Showa Denko K.K.
Column: Two columns of "HFIP-606M" were connected in series with 1 column of "HFIP-G" as a pre-column.
Column temperature: 40° C.
Elution liquid: HFIP solution containing sodium trifluoroacetate dissolved at 5 mM.
Flow rate: 0.6 ml/min.
Detector: RI (differential refractive index) detector.
Molecular weight calibration: Effected by using 5 species of standard polymethyl methacrylate having different molecular weights.

(5) Heat Resistance Evaluation

Ca. 5 g each of a PGA composition was placed in a metal frame for tablet formation, sandwiched between a pair of aluminum plates and held for 30 minutes under a pressure of ca. 1 MPa in a press machine at a prescribed temperature of 270° C., 290° C. or 300° C. Each tablet thus prepared was crystallized by heating for 30 minutes in an over at 80° C., and the thus-crystallized tablet was subjected to measurement of YI (yellowness index) value by means of color meter ("TC-1800 MK II", made by Nippon Denshoku K.K.). Incidentally, a smaller YI value represents less coloring.

Example 1

To 100 wt. parts of polyglycolic acid resin (PGA) (made by Kureha Corporation), 0.03 wt. part of commercially available stearyl phosphate mixture (a mixture of ca. 50 mol % of monostearyl phosphate and ca. 50 mol % of distearyl phosphate; "AX-71" made by Asahi Denka K.K.), and the mixture was supplied to a feed port of a twin-screw kneading extruder ("LT-20" made by Toyo Seiki K.K.) with screw zone temperatures held at 220-250° C. to be melt-kneaded and formed into a pellet-from PGA composition. Then, 0.5 wt. part of commercially available N,N-2, 6-diiscopropylphenyl-carbodiimide (CDI) ("DIPC" made by Kawaguchi Kagaku K.K.) was added to 100 wt. parts of the pellet-form PGA composition, and the mixture was supplied to the twin-screw kneading extruder ("LT-20" made by Toyo Seiki K.K.) under the same conditions as above to be melt-kneaded and formed into a pellet-form PGA composition.

Examples 2

To 100 wt parts of PGA (made by Kureha Corporation), 0.03 wt part of the same commercially available stearyl phosphate mixture as the one used in Example 1 ("AX-71" made by Asahi Denka K.K.), and the mixture was supplied to a feed port of a twin-screw kneading extruder ("TEX 44 α II" made by Nippon Seikosho K.K.; L/D=70) with cylinder sections C1-C22 disposed from the feed port to the discharge port respectively set at temperatures of 50-250° C. and a die-part set temperature of 230° C. and melt-kneaded under the conditions of an extrusion rate of 75 kg/h and a screw rotation speed of 75 rpm. Further, 0.5 wt. part of commercially available N,N-2,6-diisopropylphenyl-dicarbodiimide (CDI) ("DIPC" made by Kawaguchi Kagaku K.K.) per 100 wt. parts of the PGA was supplied to a side-feed section formed at the C11 position of the same extruder to continue the melt-mixing and then extrude the molten mixture, thereby obtaining a pellet-form PGA composition.

Comparative Example 1

A pellet-form PGA composition was obtained by performing the melt-kneading and extrusion in the same manner as in Example 1 except that the N,N-2,6-diisopropylphenyl-carbodiimide was supplied to the twin-screw kneading extruder together with the PGA and the stearyl phosphate mixture ester.

The following Table 1 shows the results of evaluation of heat-resistances (YI values of tablet samples obtained at different press temperatures) and Table 2 shows the evaluation results of moisture resistance, respectively, of the pellet-form PGA compositions prepared in the above Comparative Example and Examples.

TABLE 1

| | YI-value | | |
|---|---|---|---|
| Press temperature | Comparative Example 1 (simultaneous addition) | Example 1 (successive addition) | Example 2 (successive addition) |
| 270° C. | 26 | 16 | 22 |
| 290° C. | 42 | 33 | 34 |
| 300° C. | 55 | 51 | 48 |

TABLE 2

| | Moisture resistance | | |
|---|---|---|---|
| | Comparative Example 1 (simultaneous addition) | Example 1 | Example 2 |
| Glycolide content (wt. %) | 0.10 | 0.19 | 0.17 |
| Terminal carboxyl group concentration (eq/t) | 1 | 1 | 1 |
| Initial molecular weight (Mw) × $10^4$ | 20.5 | 22.9 | 21.0 |
| Molecular weight after 3 days (Mw) × $10^4$ | 10.6 | 13.9 | 12.7 |
| Molecular weight retentivity (%) | 52 | 61 | 60 |

From the results shown in Table 1 and Table 2 above, it is understood that, in the cases of performing melt-kneading under heating by adding the same amounts of thermal stabilizer and carboxyl group-capping agent, PGA resin compositions having an improved moisture resistance and a noticeably smaller YI value (less coloring) can be obtained in the cases of adding the additives in the order named (Examples 1 and 2) than in the case of adding the additives simultaneously (Comparative Example 1).

The invention claimed is:

1. A process for producing an aliphatic polyester resin composition, comprising subjecting an aliphatic polyester resin first to hot-melt mixing with a thermal stabilizer and then to hot-melt mixing with a carboxyl group-capping agent, wherein the aliphatic polyester resin is a polyglycolic acid resin, the thermal stabilizer is a phosphate ester or phosphite ester compound, and the carboxyl group-capping agent is a carbodiimide compound or an epoxy compound.

2. A production process according to claim 1, wherein the thermal stabilizer is at least one compound selected from the group consisting of a phosphoric acid ester having a pentaerythritol skeleton and an alkyl phosphate or phosphite ester having at least one hydroxyl group and at least one alkyl ester group.

3. A production process according to claim 1, wherein the carboxyl group-capping agent is a monocarbodiimide.

* * * * *